Figure 1:
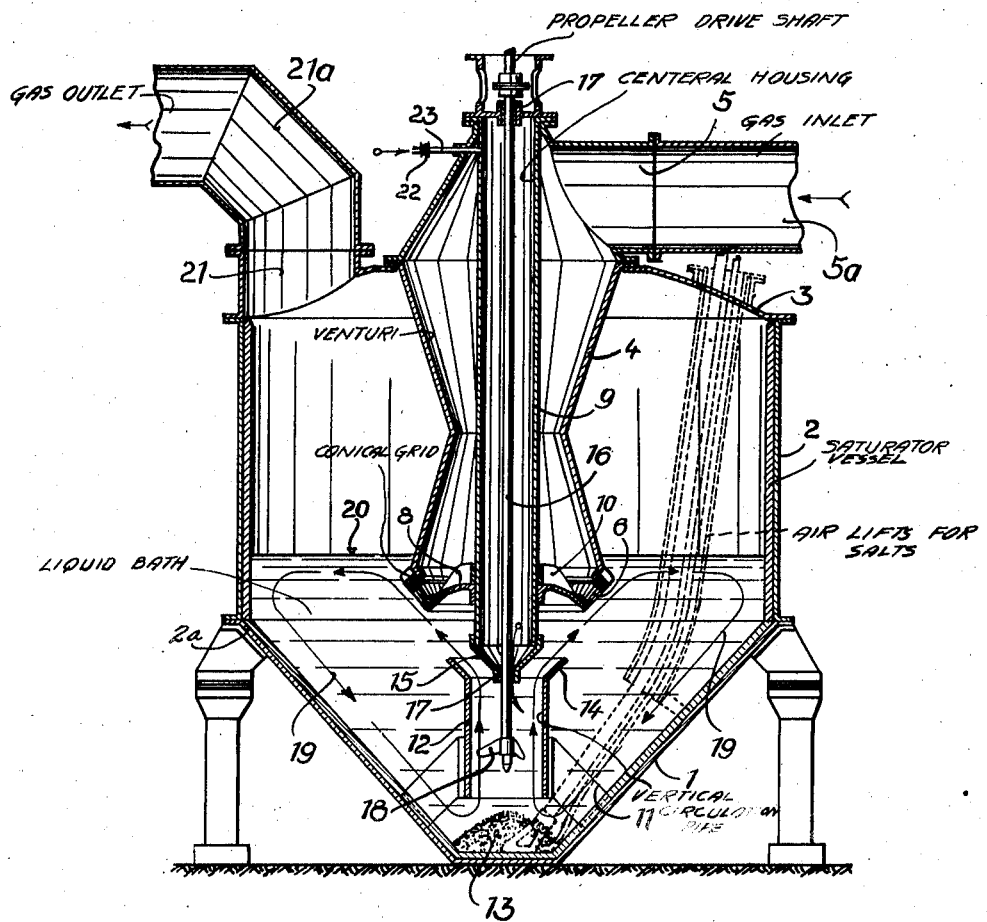

Dec. 27, 1938.  H. KOPPERS  2,141,186
SATURATOR FOR THE MANUFACTURE OF COARSE-CRYSTALLINE SULPHATE OF AMMONIA
Filed April 7, 1937  2 Sheets-Sheet 1

Dec. 27, 1938.  H. KOPPERS  2,141,186
SATURATOR FOR THE MANUFACTURE OF COARSE-CRYSTALLINE SULPHATE OF AMMONIA
Filed April 7, 1937  2 Sheets-Sheet 2

Inventor:
Heinrich Koppers
By Henry Love Clarke
his atty.

Patented Dec. 27, 1938

2,141,186

UNITED STATES PATENT OFFICE 2,141,186

SATURATOR FOR THE MANUFACTURE OF COARSE-CRYSTALLINE SULPHATE OF AMMONIA

Heinrich Koppers, Essen, Germany

Application April 7, 1937, Serial No. 135,421
In Germany April 20, 1936

6 Claims. (Cl. 261—93)

The invention relates to contrivances, more particularly saturators for the manufacture of sulphate of ammonia from sulphuric acid and ammoniacal gases or vapours, e. g. coal distillation gases or other gases or vapours made in the coke oven industry, or to similar apparatus, and in particular to those saturators or the like, which are used for the manufacture of a coarse-crystalline sulphate of ammonia or other salts.

Many types of saturators, suitable for producing coarse crystals have already been proposed. According to a certain proposal, the saturators have been equipped with agitators for whirling-up the crystals accumulating on the bottom and for moving them back into that zone of the liquid, where the ammonia or other gas or steam containing ammonia enter the saturator liquid bath. Further, attempts have been made to arrive at the same effect, by introducing air or other gases, e. g. ammonia-free coal distillation gas under a suitable pressure into the saturator liquid near the bottom of the saturator. Due to the fact that the crystals are hindered from accumulating on the saturator bottom, and that the crystals are instead returned to the zone where ammonia and sulphuric acid combine, the crystals are supposed to have a further opportunity to grow up to the desired size.

All former contrivances for the manufacture of a coarse-crystalline sulphate of ammonia or the like have, however, shown the disadvantage that the crystals whirled-up are only partially returned to the zone where the ammonia combines with the sulphuric acid. Consequently, the salt made from the crystals is of a different grain size and contains in particular too many crystals of undesired small size.

The main object of my present invention now consists in providing such improvements in the saturators for the manufacture of sulphate of ammonia or the like, which enable the manufacture of a coarse-crystalline salt of uniform size in an economical and practical way.

My invention is based upon my experience that the small crystals first formed in the saturator can only grow uniformly up to the desired size, if the circulating liquid flows through the saturator in such a way that the small crystals are fully kept in suspension and if, on the other hand, all crystals will pass the reaction zone.

Therefore, my invention consists in providing within the saturator a substantially vertical pipe, open at both its upper and its lower ends, through the lower opening of which the liquid is drawn in by means of a suitable agitator or the like, inside the pipe, and from the upper opening of which the liquid is uniformly distributed over the whole reaction zone, touching all the points where the ammoniacal gases or the like are introduced into the liquid, whereafter the liquid enriched with ammonia flows to the bottom of the saturator, from where it is again returned to the circulation pipe.

Preferably, I arrange a pipe for the introduction of ammonia-gas into the saturator liquid in the middle of the saturator. I provide this pipe with a conical bottom and with a multitude of openings spaced along its circumference, near the bottom. The ammoniacal gases flow through said openings into the liquid, coming from the interior of the circulation pipe. A conical distributor, namely the conical bottom of the gas inlet pipe partially extends into the circulation pipe, so that a ring-shaped space is formed between the inner conical distributor or bottom and the upper outer line of the circulation pipe. This space has an effect similar to a ring-shaped nozzle by which the liquid is uniformly distributed over the whole periphery of the ammonia gas inlet pipe and thus over all gas inlets.

According to my invention, it is further possible to equip the upper edge of the vertical circulating pipe with a border or flange turned outwardly, which essentially extends parallel to the outlet of the conical distributor or bottom of the ammonia gas inlet pipe, by which the directing effect of the nozzle-shaped space between the circulating pipe and the gas inlet pipe is increased.

Further important objects and features of novelty of my invention will be apparent from the description taken in connection with the drawings in which Figure 1 is a vertical section through a saturator for the manufacture of a coarse-crystalline sulphate of ammonia.

Figure 2:
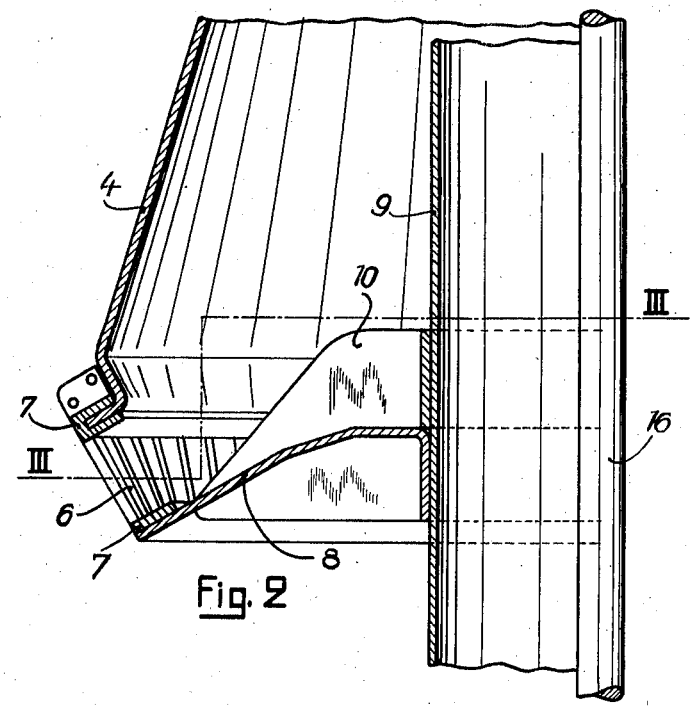

Figure 2 shows on an enlarged scale a vertical section through a part of the gas inlet pipe of the saturator, according to Figure 1.

Figure 3:
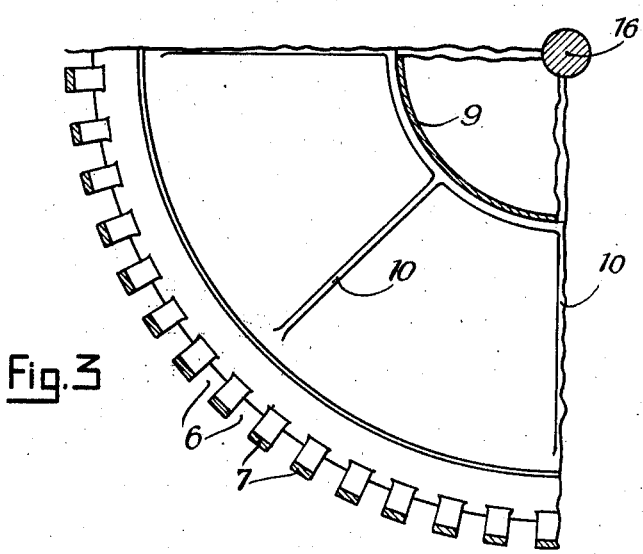

Figure 3 finally is a horizontal section on lines III—III of Figure 2.

The saturator shown on the drawings comprises a casing 2, fitted with a conical bottom 1. The casing 2 is situated upon a frame 2a, and the top of the casing is closed by the roof 3. From the roof 3 a gas inlet pipe 4 extends inside the casing from outside the same, to the outer side of which is connected a pipe branch 5, which is connected with the gas supply pipe 5a.

The construction of the lower end of the gas inlet pipe 4 is fully detailed in Figure 2. A conical pipe grid-part 7, having a number of slots 6, is fastened to the lower edge of the pipe 4, being slantingly drawn-in towards the interior. The pipe part 7 is composed of an upper fastening channeled annulus substantially U-shaped in cross-section and a lower seating annulus with spaced bars between them to form the slots 6. The bottom 8 rising upwards towards the center is connected with the lower seating annulus of grid part 7. The bottom 8 forms a closure to the interior of the gas-inlet pipe 4, for the bath of the saturator. The center of the gas inlet pipe 4 accommodates a vertical pipe 9, which extends through the bottom 8 of the gas inlet pipe. A number of vertical guide walls 10 are likewise built up on the bottom 8 which prevent the bath from surging over from one side of the gas inlet pipe to another. The guide walls 10 may divide the gas inlet pipe 4 into separate sectors, if required.

As shown in Figure 1, the gas inlet consists of a circular row of holes 6, which are provided at the lower end of the gas inlet pipe 4. A vertical circulating pipe 12 is placed upon supports 11, underneath the bottom 8 of the gas inlet pipe 4 in the bath of the saturator. The circulating pipe 12, which is preferably adjustable as regards height, is open at the top and at the bottom and is situated above the lowest point of the saturator bottom 1, at which the accumulation of fixed sulphate of ammonia formed during the operation takes place, as indicated at 13.

The upper end of the circulating pipe 12 is fitted with an extension 14, which is entered partially by the conical end 15 of the central pipe 9, so that an aperture is formed having the shape of a ring-nozzle.

The central pipe 9 is pierced by a shaft 16, which is supported rotatably at 17. The lower end of the shaft 16 reaching into the circulating pipe 12 carries a propeller 18, the vanes of which are formed in such a way, that on turning the shaft 16 the liquid is sucked into the circulating pipe 12 from below.

The liquid touched by the propeller 18 is moved upwards within the circulating pipe 12 and leaves the upper end 14 of the circulating pipe, preferably at an increased speed at the ring-shaped nozzle. The stream of liquid is controlled by a suitable regulation of the speed of the shaft 16 and by a suitable adjustment of the height of the propeller 18 in the circulating pipe 12, in such a way, that the stream of liquor may circulate through the bath as indicated by the line 19. Therefore, the liquor after leaving the circulating pipe 12 first flows along the gas inlets 6 and reaches from there the surface of the bath as indicated at 20. Finally, it flows along the conical bottom 1 of the saturator back again into the lower end of the circulating pipe 12.

The circulation of the liquid through the pipe 12 is so adjusted, that the crystals accumulating on the bottom of the saturator at 13 are whirled-up in a suitable manner, so that essentially only the smaller crystals will enter the circulating steam. The smaller crystals are thus repeatedly delivered into the zones of increased concentration of ammonia and in which the salt of the bath is being formed, so that the smaller crystals will be given an opportunity to become larger.

The gas freed from ammonia finally leaves the saturator through the pipe branch 21, arranged in the roof 3 and through the pipeline 21a.

The large crystals not carried forward by the liquor stream circulating through the pipe 12 are accumulated on the bottom of the saturator and are removed suitably by a common form of airlift therefor.

According to the invention, the saturator is preferably operated in such a way, that the conditions of crystallization which are very important for the saturator bath are kept constant as far as possible. Among others, the temperature of the bath and the concentration of acid are of utmost importance. Under certain conditions, it may be of advantage to provide the saturator, with a suitable lining, as shown on the drawings, preferably consisting of refractory brickwork, in case higher variations in temperature will exist at the place of installation of the saturator. The acid to be added into the saturator is delivered continuously preferably in such a way, that it is added to the mother-liquor, made when drying the crystals. The mother-liquor is preferably heated-up before it is introduced again into the saturator. This also applies to all parts of the bath which for instance have to be separated from the saturator continuously or periodically, to remove the tar.

In order to prevent the bath from entering the centerpipe 9 from below, in which are arranged the bearings for the propeller shaft 16, it is advisable to add continuously or periodically a certain quantity of water into the center pipe 9, through the pipeline 23, controlled by a valve 22, so that a smaller quantity of water will run-off continuously through the lower bearings 17 into the saturator.

Very good results have already been obtained with a saturator constructed according to the invention, which has been operated under various operating conditions. The inventor is of the opinion, that the good results have been obtained on account of the fact, that the liquid leaving the upper nozzle-like orifice of the circulating pipe first of all meets the inlets for ammoniacal gas, thus increasing the concentration of sulphate of ammonia in the liquid stream. Moreover, the liquor stream is heated-up at the gas inlet corresponding to the reaction heat of the sulphate of ammonia. The stream of liquor heated-up and showing an increased concentration of sulphate of ammonia now enters the bath-surface, where the water is evaporated by which the concentration of sulphate of ammonia is further increased. This increased concentration of sulphate of ammonia, due to the several circumstances, results in a growing of the crystals, which are present in the circulating liquid. The crystals will finally also grow, if the circulating liquid flows downwards along the saturator bottom, since there the liquid is cooled down, by which the solubility of the bath as regards sulphate of ammonia is reduced.

I have now described my present invention on the lines of a preferred embodiment thereof, but my invention is not limited in all its aspects to the mode of carrying out as described and shown, since the invention may be variously embodied within the scope of the following claims.

I claim:—

1. A saturator apparatus for liquid baths comprising a vessel provided with a central gas inlet conduit extending downwardly into the vessel and terminating at its lower end in a gas outlet end adapted to be submerged below the surface of a liquid bath within the vessel, and with a lower submerged vertical circulation pipe located below the gas outlet end and open at its upper and lower end for vertical circulation of liquid of the bath from below through the same into the path of gas issuing from the submerged outlet of the gas inlet conduit; said gas outlet end comprising an outer annular grid of ports and an inner conical bottom closure for closing of the interior of the gas inlet conduit from ingress of liquid from the bath, the ports of the grid terminating in a downwardly and outwardly facing oblique plane and the bottom closure rising into the interior towards the center of the gas inlet conduit to form with the gas inlet conduit and the grid of ports a conical nozzle terminating in the grid of ports; and the upper open end of the lower vertical circulation pipe being flared upwardly and outwardly at an angle of inclination similar to the oblique plane of the grid ports and in the direction thereof to cause the circulating liquid to flow thereto and thence to the surface of the bath in a direction toward the periphery of the vessel.

2. Apparatus as claimed in claim 1, and in which the downwardly extending vertical gas conduit is constructed as a venturi with the throat thereof intermediate the conical bottom thereof and an upper gas inlet thereto.

3. Apparatus as claimed in claim 1, and in which a central housing is disposed within the gas inlet conduit, and extends downwardly through the lower conical bottom therefor, and terminates within the upper open end of the lower vertical circulation pipe, and in which the lower end of the central housing is capped by an inverted conical hood in spaced relation to the flared top of the vertical circulation conduit so as to form therewith an annular nozzle.

4. Apparatus as claimed in claim 1, and in which a central housing is disposed within the gas inlet conduit, and extends downwardly through the lower conical bottom therefor, and terminates within the upper open end of the lower vertical circulation pipe, and in which the lower end of the central housing is capped by an inverted conical hood in spaced relation to the flared top of the vertical circulation conduit so as to form therewith an annular nozzle, and in which a rotatable shaft extends through the central housing and lower inverted conical bottom as a lower bearing therefor and terminates with a propellor within the vertical circulation pipe, and in which means are provided for introducing liquid into the central housing to seal the central housing from ingress of liquid from the bath thereto through the lower bearing for the rotatable shaft.

5. Apparatus as claimed in claim 1 and in which an annular series of radially extending upstanding partitions are provided on the upper surface of the conical bottom closure within the gas inlet conduit above the grid of ports to prevent liquid from the bath surging over from one side of the gas inlet pipe to another.

6. Apparatus as claimed in claim 1, and in which a central housing is disposed within the gas inlet conduit, and extends downwardly through the lower conical bottom therefor, and terminates within the upper open end of the lower vertical circulation pipe, and in which the lower end of the central housing is capped by an inverted conical hood in spaced relation to the flared top of the vertical circulation conduit so as to form therewith an annular nozzle, and in which the gas inlet conduit is constituted as a venturi with the throat thereof above the grid ports, and in which radially extending upstanding partitions are arranged in an annular series inside the gas conduit on the lower conical bottom closure therefor.

HEINRICH KOPPERS.